(12) United States Patent  
Spencer et al.

(10) Patent No.: US 7,628,442 B1  
(45) Date of Patent: Dec. 8, 2009

(54) QUICK RELEASE CLAMP FOR TONNEAU COVER

(75) Inventors: Michael R. Spencer, Hubbard, NE (US); Marion Craig Padgett, Omaha, NE (US); Kelly Kneifl, Hartington, NE (US); Ryan Rusher, Yankton, SD (US)

(73) Assignee: Truxedo, Inc., Yankton, SD (US)

( * ) Notice: Subject to any disclaimer, the term of this patent is extended or adjusted under 35 U.S.C. 154(b) by 300 days.

(21) Appl. No.: 11/859,744

(22) Filed: Sep. 22, 2007

Related U.S. Application Data

(60) Provisional application No. 60/862,809, filed on Oct. 25, 2006.

(51) Int. Cl.  
*B60P 7/02* (2006.01)

(52) U.S. Cl. .................... 296/100.07; 296/100.04; 24/455; 24/495

(58) Field of Classification Search .......... 296/100.04, 296/100.07, 100.16, 100.1, 100.02, 100.03, 296/100.08, 100.05, 100.06, 100.09; 24/455, 24/495, 499  
See application file for complete search history.

(56) References Cited

U.S. PATENT DOCUMENTS 7,258,387 B2 *   8/2007  Weldy .................... 296/100.07  
2007/0271745 A1 * 11/2007  Frey .......................... 24/568

* cited by examiner

*Primary Examiner*—Lori L Lyjak  
(74) *Attorney, Agent, or Firm*—Dicke, Billig & Czaja, PLLC

(57) ABSTRACT

A quick release clamp including a first clamp member, a second clamp member, and a clamp handle. The first clamp member has a first gripping surface. The second clamp member has a second gripping surface. The clamp handle has a partially curved outer surface that is defined by a central clamp axis. The cylindrical plug is defined by a central plug axis that is offset from the central clamp axis. The shaft operably attaches the first clamp member and the cylindrical plug.

34 Claims, 4 Drawing Sheets

QUICK RELEASE CLAMP FOR TONNEAU COVER

REFERENCE TO RELATED APPLICATION

This application claims priority to U.S. Applic. No. 60/862,809, filed Oct. 25, 2006, the content of which is incorporated herein by reference

FIELD OF THE INVENTION

The invention relates generally to clamps. More particularly, the invention relates to clamps for use with covers that extend over a cargo box on a pickup.

BACKGROUND OF THE INVENTION

Tonneau covers have been successfully commercialized by the Shur Company of Yankton, S. Dak. and are described in various patent documents, including Spencer, U.S. Pat. No. 6,568,740; Dimmer, U.S. Pat. No. 6,575,520; and Spencer, US Patent Publication No. 2004/0212212.

Tonneau covers are used in conjunction with the cargo box of pickups to protect items placed in the cargo box from exposure to dirt, debris, and other environmental contaminants. Tonneau covers are also used to enhance the aesthetic appearance of the pickup.

There are two main types of tonneau covers—hard and soft. The hard tonneau covers include one or more pieces that when placed in a closed position form a generally rigid cover over the cargo box. In contrast, the soft tonneau covers are fabricated from a soft material. When the soft tonneau covers are not being used, they may be rolled up to expose the interior of the cargo box.

To decrease the time associated with installing the tonneau covers and enable the tonneau cover to be readily removed, various tonneau cover attachment mechanisms have been developed. One configuration for clamps used in conjunction with tonneau covers has two clamp members that interlock at a pivot point and are forced together by tightening a threaded fastener. When the fastener is tightened using a wrench or other tool, the clamp members are urged together to force a portion of the tonneau cover into frictional engagement with a side of the pickup cargo box.

One such clamping system is described in Dimmer, U.S. Pat. No. 6,568,740, which is assigned to the assignee of the present application. The Dimmer clamp includes two clamping sections that are pivotally mounted together and held together with a bolt.

Another clamping system is discussed in Wheatley, U.S. Pat. No. 6,893,073. Similar to the Dimmer clamp, the Wheatley clamp includes two clamping sections that are operably attached to each other with a bolt. Still another clamping system is discussed in Kerstling, U.S. Pat. No. 5,540,475. The Kerstling clamp has a two-part configuration and is operable by manually moving a clamp handle.

SUMMARY OF THE INVENTION

An embodiment of the invention is direct to a quick release clamp including a first clamp member, a second clamp member, a clamp handle, a cylindrical plug and a shaft. The first clamp member has a first gripping surface. The second clamp member has a second gripping surface. The clamp handle has a partially curved outer surface that is defined by a central clamp axis. The cylindrical plug is defined by a central plug axis that is offset from the central clamp axis. The shaft operably attaches the first clamp member and the cylindrical plug.

Various specific embodiments of multiple aspects of the invention are illustrated and described in the documents appended to this application, although the scope of the invention is not limited to only those embodiments so depicted.

DETAILED DESCRIPTION

Figure 2:
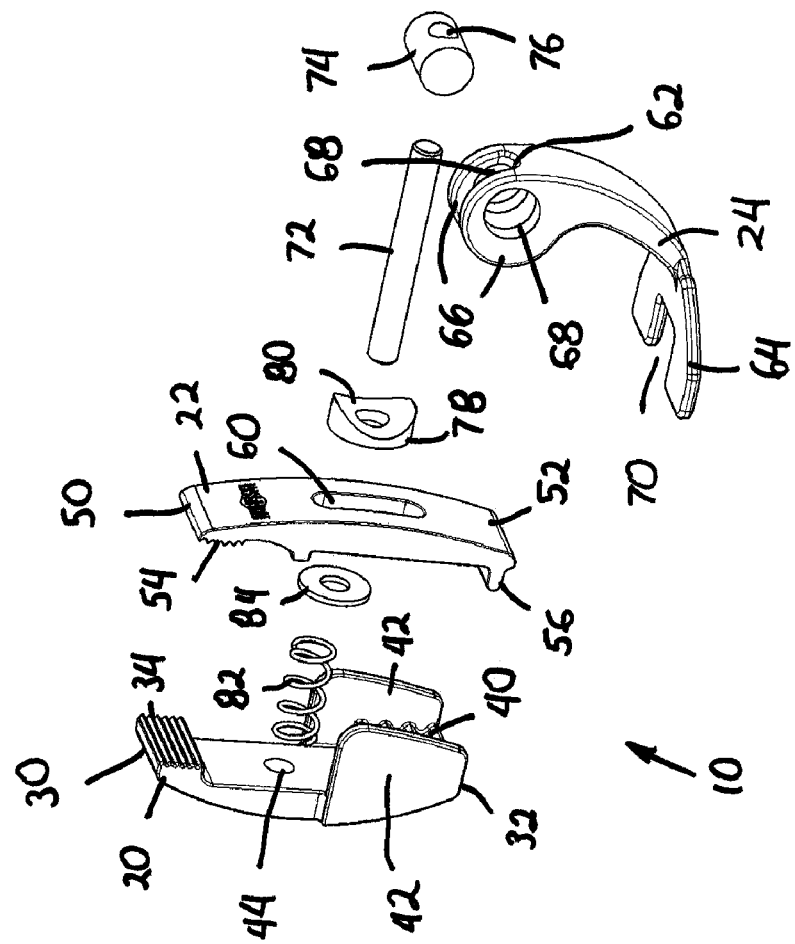
FIG. 2 is an exploded perspective view of the quick release clamp.
Figure 1:
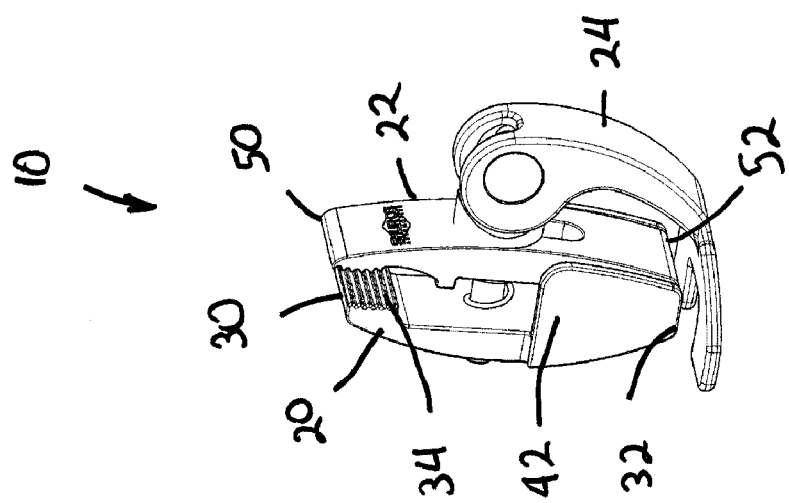
FIG. 1 is a perspective view of a quick release clamp according to an embodiment of the invention.
Figure 4:
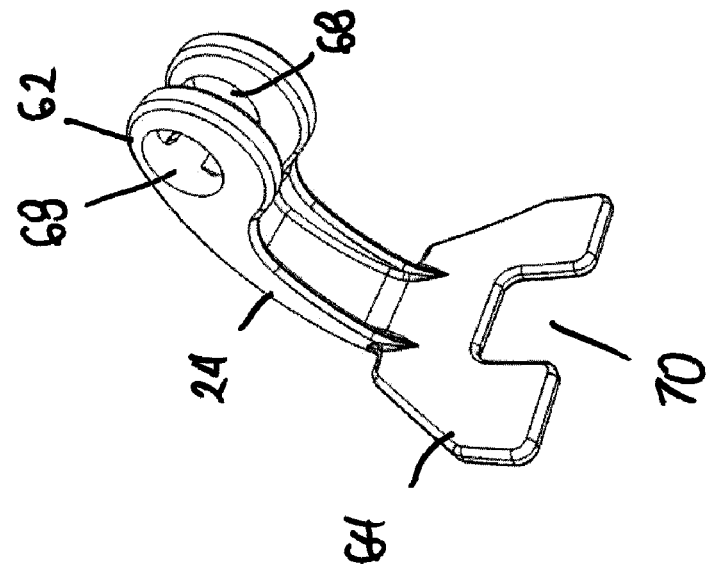
FIG. 4 is a perspective view of a clamp handle for the quick release clamp.
Figure 3:
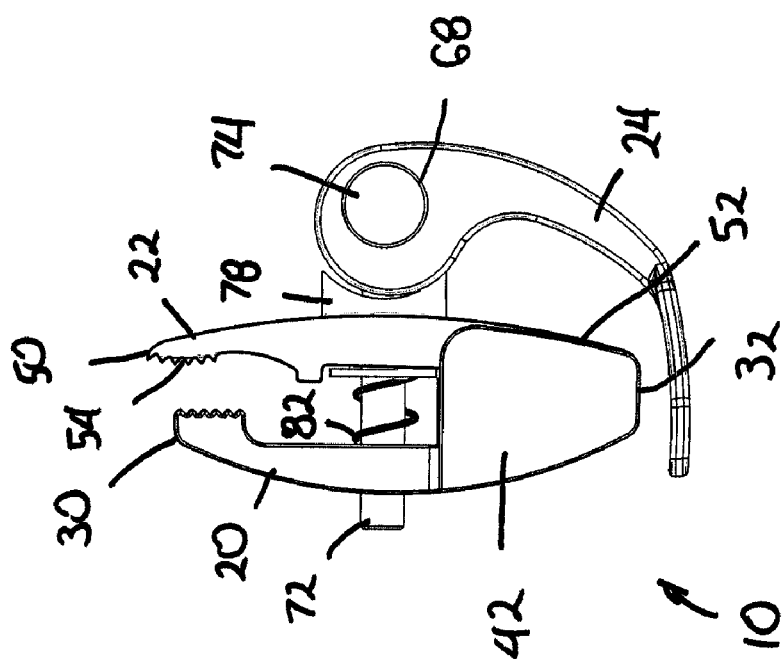
FIG. 3 is a side view of the quick release clamp.
Figure 5:
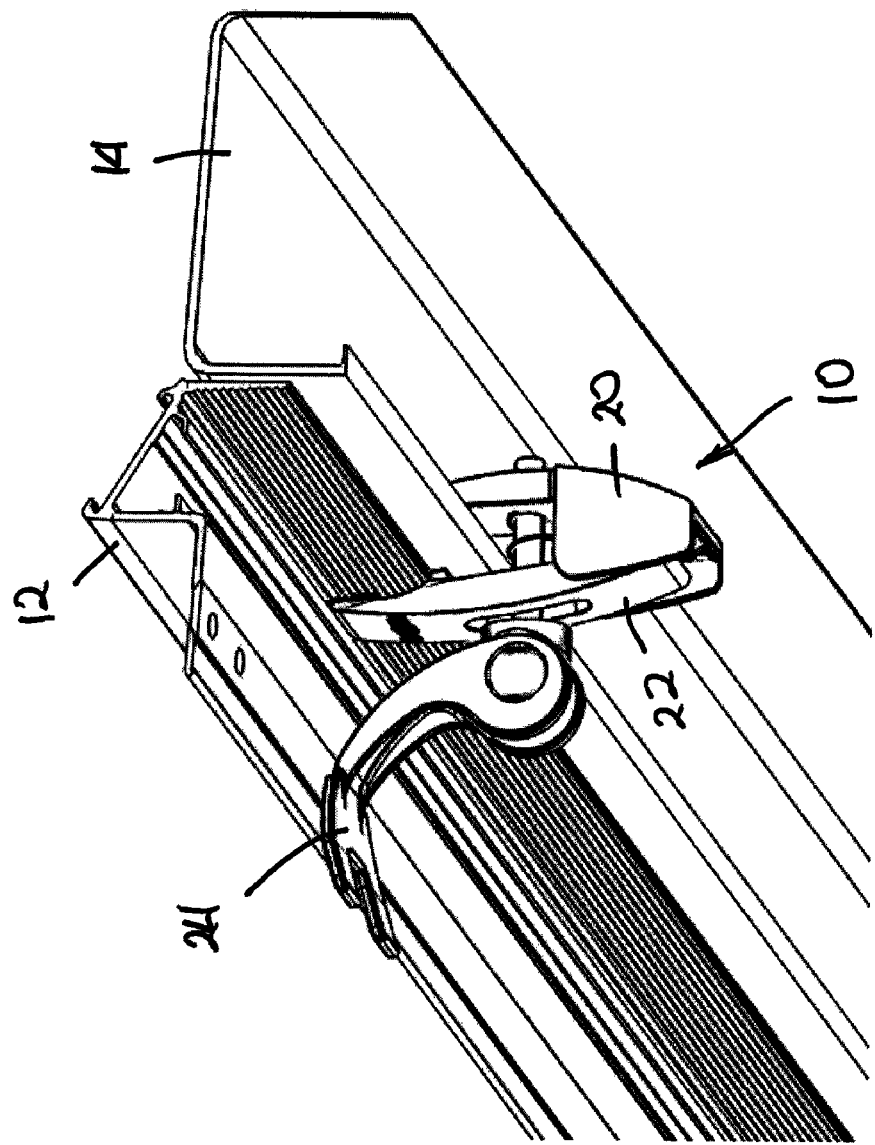
FIG. 5 is a perspective view of the quick release clamp in a disengaged position adjacent to a cargo box cover rail and a side of a pickup cargo box.
Figure 6:
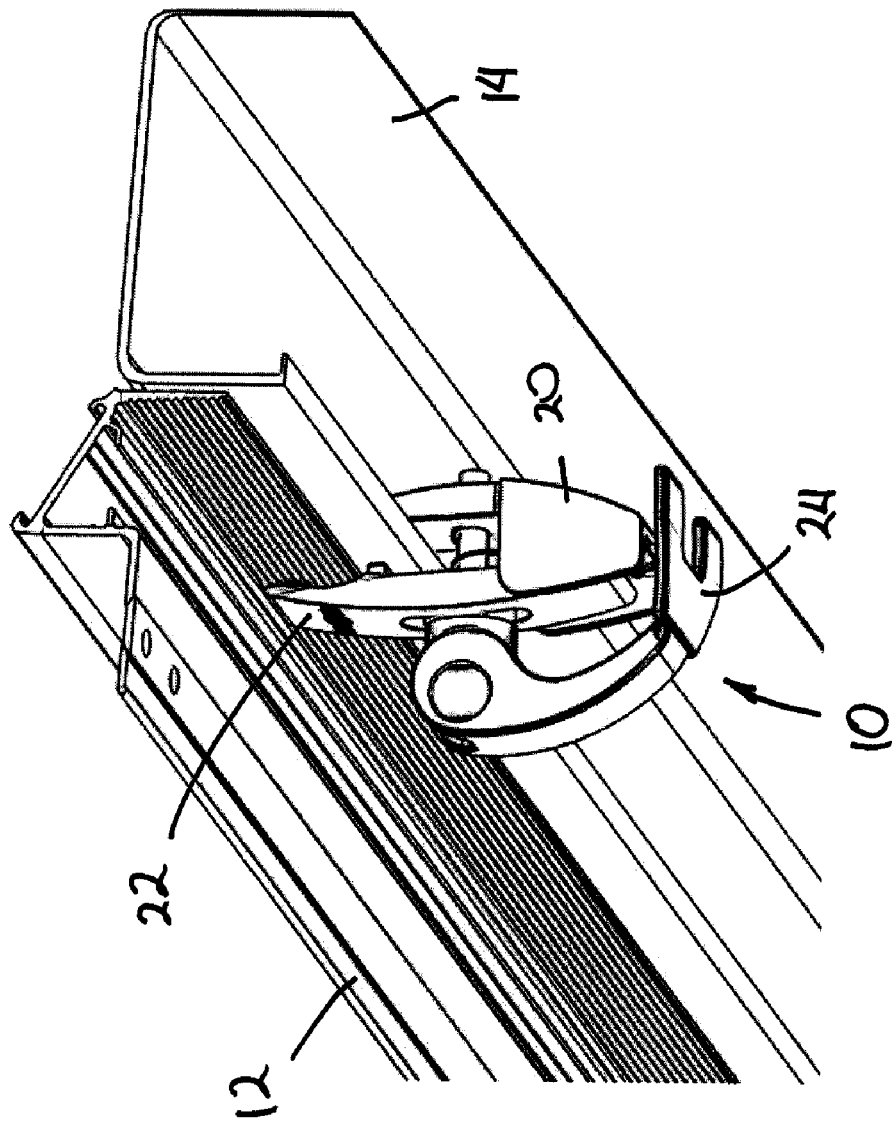
FIG. 6 is a perspective view of the quick release clamp in an engaged position attaching the cargo box cover rail to the side of the pickup cargo box.

An embodiment of the invention is directed to a quick release clamp, as illustrated at 10 in the figures. One application that the quick release clamp 10 is particularly suited is for attaching a tonneau cover 12 to a cargo box 14 on a pickup. The quick release clamp 10 thereby enables the tonneau cover 12 to be attached to and detached from the cargo box 14 of the pickup without the use of tools.

The quick release clamp 10 generally includes a first clamp member 20, a second clamp member 22 and a clamp handle 24. The clamp handle 24 enables the first clamp member 20 and the second clamp member 22 to be manually moved between an engaged configuration and a disengaged configuration.

The first clamp member 20 may have an elongated configuration with a first end 30 and a second end 32. Proximate the first end 30, the first clamp member 20 may include a gripping surface 34 having a plurality of ridges formed therein.

While the figures illustrate the gripping surface 34 as being integrally formed in the first clamp member 20, it is possible for the gripping surface 34 to be formed separately from the other portions of the first clamp member 20 and the gripping surface 34 may be fabricated from a material that is different than the other portions of the first clamp member 20.

Proximate the second end 32, the first clamp member 20 may include a plurality of pivot recesses 40. The pivot recesses 40 enable a pivot point between the first clamp member 20 and the second clamp member 22 to be shifted so that the quick release clamp 10 can be utilized to hold together materials having different orientations and positions.

The first clamp member 20 may also include guide walls 42 on each side proximate the second end 32. The guide walls 42 limit lateral motion of the second clamp member 22 with respect to the first clamp member 20. The guide walls 42 also provide a location for a person using the quick release clamp 10 to hold onto the quick release 10 while reducing the potential that the person's fingers will get pinched between the first clamp member 20 and the second clamp member 22.

Intermediate the first end 30 and the second end 32, the first clamp member 20 may have an aperture 44 formed therein for use in operably attaching the first clamp member 20, the second clamp member 22 and the clamp handle 24, as described in more detail below.

Similar to the first clamp member 20, the second clamp member 22 may have an elongated configuration with a first end 50 and a second end 52. Proximate the first end 50, the second clamp member 22 may include a gripping surface 54 having a plurality of ridges formed therein.

While the figures illustrate the gripping surface 54 as being integrally formed in the second clamp member 22, it is possible for the gripping surface 54 to be formed separately from the other portions of the second clamp member 22 and the gripping surface 54 may be fabricated from a material that is different than the other portions of the second clamp member 22.

Proximate the second end 52, the second clamp member 22 may have a pivot extension 56 extending therefrom. This configuration provides the quick release clamp 10 with multiple pivot points. The pivot extension 56 is adapted to selectively engage one of the pivot recesses 40. Changing the pivot recess 40 that the pivot extension 56 is positioned in enables the gripping surface 34 to be shifted with respect to the gripping surface 54 so that the quick release clamp 10 can be utilized with a variety of tonneau covers 12 and pickup cargo boxes 14.

Intermediate the first end 50 and the second end 52, the second clamp member 22 may have a slot 60 formed therein for use in operably attaching the first clamp member 20, the second clamp member 22 and the clamp handle 24, as described in more detail below.

The clamp handle 24 may include a pivoting portion 62 and a handle portion 64. The pivoting portion 62 may include two pivoting portion legs 66 that are mounted in a spaced-apart configuration. Each of the pivoting portion legs 66 may have an aperture 68 formed therein that may be axially aligned.

At least a section of the pivoting portion legs 66 has a curved outer surface 94 to facilitate pivoting the clamp handle 24 with respect to the second clamp member 22. The outer surface 94 is at least partially circular, having a central leg axis 92. In one configuration, the outer surface 94 extends at least 270 degrees.

The handle portion 64 may be curved so that the handle portion 64 is adjacent to or extends partially over at least one of the first clamp member 20 and the second clamp member 22. In another configuration, part of the handle portion 64 extends past the second clamp member 22. In still another configuration, part of the handle portion 64 extends past the first clamp member 20 and the second clamp member 22. Alternatively, the handle portion 64 may include more than one section that is oriented at an angle with respect to each other to provide a similar configuration.

Forming the handle portion 64 with the preceding shape reduces the potential that the handle portion 64 may be inadvertently contacted, such as when moving items into or out of the pickup cargo box 12. This configuration also reduces the potential of damage to the handle portion 64.

An end of the handle portion 64 opposite the pivoting portion 62 may have a recess 70 formed therein that defines two legs. This configuration enables a screwdriver or other implement to be placed in the recess 70 to urge the clamp handle 24 to the disengaged configuration.

The end of the handle portion 64 opposite the pivoting portion 62 may also have a width that is greater than the pivoting portion 62 to enhance the ability to manually move the handle portion 64 between the engaged configuration and the disengaged configuration.

The handle portion 24 is operably attached to the first clamp member 20 and the second clamp member 22 with a shaft 72. The shaft 72 may be substantially cylindrical and may have threads proximate opposite ends thereof. Alternatively, the shaft 72 may be operably attached using other mechanisms such as a cotter pin (not shown).

A first end of the shaft 72 may engage the first clamp member 20 through the aperture 40. A second end of the shaft 72 may engage a cylindrical plug 74. The cylindrical plug 74 is defined by a central plug axis 90 and has a diameter that generally conforms to a diameter of the aperture 68. The cylindrical plug 74 also has a plug aperture 76 formed therein with a threaded surface through which the second end of the shaft 72 may be attached thereto. The quick release clamp 10 thereby operates on a cam action.

The central plug axis 90 may be offset from the central leg axis 92 to provide the clamp handle 24 with an over-center configuration that provides a camming action to not only move the first clamp member 20 and the second clamp member 22 towards each other, but also to retain the clamp handle 24 in a stationary position when the clamp 10 is in the closed configuration.

Using such a configuration causes the first clamp member 20 and the second clamp member 22 to be urged toward each other as the clamp handle 24 is pivoted. It may be possible to maintain the clamp handle 24 in a closed configuration using alternative mechanisms such as a latch.

Rotation of the clamp handle 24 with respect to the first clamp member 20 about the threads on the shaft 72 and the cylindrical plug 74 causes a distance between the first clamp member 20 and the cylindrical plug 74 to increase or decrease to adapt the quick release clamp 10 to mounting applications having differing thicknesses.

A pivot guide 78 may be positioned over the shaft 72 between the second clamp member 22 and the clamp handle 24. The pivot guide 78 may have a concaved surface 80 that generally conforms to the pivoting portion 62.

The quick release clamp 10 may also include a resilient mechanism 82, such as a spring positioned between the first clamp member 20 and the second clamp member 22. The resilient mechanism 82 may be positioned over the shaft 72. A washer 84 may be positioned adjacent an end of the resilient mechanism 82 to preclude the resilient mechanism 82 from entering the slot 60.

The resilient mechanism 82 between the first clamp member 20 and the second clamp member 22 forces them apart, enhancing the ability to position the quick release clamp 10 into the installation location. The resilient mechanism 82 also contributes to the operation of the height adjustment feature. The resilient mechanism 82 allows the user to easily reposition one of the clamp members into a preset position, and the resilient mechanism 82 maintains this preset position during the installation process.

There are several advantages provided by use of various embodiments of the invention. First, tools are not required for installation of the quick release clamp 10. Second, the time required to install or remove the system incorporating the quick release clamp 10 is reduced. Third, the quick release clamp 10 has a vertical adjustment feature that allows for a better installation. Fourth, the height adjustment of the quick release clamp 10 is retained by the spring-loaded mechanism.

In another embodiment (not illustrated), a "D" ring is mounted into the cam pivot. While this component increases cost, it also provides a load attachment point that does not affect handle retention.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A quick release clamp comprising:
   a first clamp member comprising a first gripping surface;
   a second clamp member comprising a second gripping surface;
   a clamp handle having a partially curved outer surface that is defined by a central clamp axis;
   a cylindrical plug defined by a central plug axis that is offset from the central clamp axis; and
   a shaft operably attaching the first clamp member and the cylindrical plug.

2. The quick release clamp of claim 1, and further comprising a pivot guide having an aperture extending therethrough through which the shaft extends, wherein the pivot guide has a concave surface.

3. The quick release clamp of claim 2, wherein the shaft has a shaft threaded surface, wherein the cylindrical plug has a plug aperture formed therein having a plug threaded surface, wherein the shaft threaded surface operably engages the plug threaded surface, wherein the first clamp member has a clamp aperture formed therein having a clamp threaded surface, and wherein the shaft threaded surface operably engages the clamp threaded surface.

4. The quick release clamp of claim 1, and further comprising a resilient mechanism biasing the quick release clamp to the open configuration.

5. The quick release clamp of claim 1, wherein the clamp handle comprises a pivoting portion having two pivoting portion legs.

6. The quick release clamp of claim 5, wherein the clamp handle comprises a handle portion having a width that is greater than a width of the pivoting portion, and wherein an end of the handle portion that is opposite the pivoting portion has a recess formed therein.

7. The quick release clamp of claim 1, wherein the first clamp member includes a plurality of pivot recesses formed therein, wherein the second clamp member includes a pivot extension extending therefrom, and wherein the pivot extension is selectively seatable in one of the pivot recesses.

8. The quick release clamp of claim 1, and further comprising a pair of guide walls extending from the first clamp member.

9. The quick release clamp of claim 1, wherein the clamp handle is curved so that a free end of the clamp handle extends past the first clamp member when the quick release clamp is in a closed configuration.

10. A quick release clamp comprising:
    a first clamp member comprising a first gripping surface, wherein the first clamp member comprises a plurality of pivot recesses formed therein;
    a second clamp member comprising a second gripping surface, wherein the second clamp member includes a pivot extension extending therefrom; and
    a clamp handle operably attaching the first clamp member and the second clamp member, wherein the clamp handle is movable between an open configuration and a closed configuration, and wherein the pivot extension is selectively seatable in one of the pivot recesses.

11. The quick release clamp of claim 10, and further comprising:
    a cylindrical plug operably mounted with respect to the clamp handle;
    a shaft operably attached to the first clamp member and the cylindrical plug; and
    a pivot guide having an aperture extending therethrough through which the shaft extends, wherein the pivot guide has a concave surface.

12. The quick release clamp of claim 10, and further comprising a resilient mechanism biasing the quick release clamp to the open configuration.

13. The quick release clamp of claim 10, wherein the clamp handle comprises a pivoting portion having two pivoting portion legs.

14. The quick release clamp of claim 13, wherein the clamp handle comprises a handle portion having a width that is greater than a width of the pivoting portion, and wherein an end of the handle portion that is opposite the pivoting portion has a recess formed therein.

15. The quick release clamp of claim 10, and further comprising a pair of guide walls extending from the first clamp member.

16. A quick release clamp comprising:
    a first clamp member comprising a first gripping surface and a pair of guide walls extending therefrom;
    a second clamp member comprising a second gripping surface, wherein the second clamp member at least partially seats between the guide walls; and
    a clamp handle operably attaching the first clamp member and the second clamp member, wherein the clamp handle is movable between an open configuration and a closed configuration.

17. The quick release clamp of claim 16, wherein the second clamp member has a width that is approximately the same as a distance between the guide walls.

18. The quick release clamp of claim 16, and further comprising:
    a cylindrical plug operably mounted with respect to the clamp handle;
    a shaft operably attached to the first clamp member and the cylindrical plug; and
    a pivot guide having an aperture extending therethrough through which the shaft extends, wherein the pivot guide has a concave surface.

19. The quick release clamp of claim 16, and further comprising a resilient mechanism biasing the quick release clamp to the open configuration.

20. The quick release clamp of claim 16, wherein the clamp handle comprises a pivoting portion and a handle portion, wherein the pivoting portion has a pivot aperture formed therein that is adapted to receive a plug, and wherein an axis of the pivot aperture is offset from an axis of the pivoting portion.

21. The quick release clamp of claim 16, wherein the first clamp member includes a plurality of pivot recesses formed therein, wherein the second clamp member includes a pivot extension extending therefrom, and wherein the pivot extension is selectively seatable in one of the pivot recesses.

22. A tonneau cover system comprising:
    a tonneau cover comprising:
      a cover portion; and
      a frame portion attached to the cover portion; and
    a quick release clamp comprising:
      a first clamp member comprising a first gripping surface;
      a second clamp member comprising a second gripping surface;
      a clamp handle having a partially curved outer surface that is defined by a central clamp axis;
      a cylindrical plug defined by a central plug axis that is offset from the central clamp axis; and
      a shaft operably attaching the first clamp member and the cylindrical plug.

23. The tonneau cover system of claim 22, and further comprising a pivot guide having an aperture extending therethrough through which the shaft extends, wherein the pivot guide has a concave surface.

24. The tonneau cover system of claim 22, and further comprising a resilient mechanism biasing the quick release clamp to the open configuration.

25. The tonneau cover system of claim 22, wherein the clamp handle comprises a pivoting portion having two pivoting portion legs.

26. The tonneau cover system of claim 25, wherein the clamp handle comprises a handle portion having a width that is greater than a width of the pivoting portion, and wherein an end of the handle portion that is opposite the pivoting portion has a recess formed therein.

27. The tonneau cover system of claim 22, wherein the first clamp member includes a plurality of pivot recesses formed therein, wherein the second clamp member includes a pivot extension extending therefrom, and wherein the pivot extension is selectively seatable in one of the pivot recesses.

28. The tonneau cover system of claim 22, and further comprising a pair of guide walls extending from the first clamp member.

29. The tonneau cover system of claim 22, wherein the clamp handle is curved so that a free end of the clamp handle extends past the first clamp member when the quick release clamp is in a closed configuration.

30. A method of attaching a tonneau cover to a cargo box on a pickup, wherein the cargo box has a side with a top rail and wherein the tonneau cover has a frame portion and a cover portion attached to the frame portion, wherein the method comprises:

providing a quick release clamp comprising:
        a first clamp member comprising a first gripping surface;
        a second clamp member comprising a second gripping surface; and
        a clamp handle having a partially curved outer surface that is defined by a central clamp axis;
        a cylindrical plug defined by a central plug axis that is offset from the central clamp axis; and
        a shaft operably attached the first clamp member and the cylindrical plug;
    positioning the quick release clamp so that at least a portion of the top rail and the frame portion are between the first gripping surface and the second gripping surface; and
    rotating the clamp handle with respect to at least one of the first clamp member and the second clamp member to urge the first clamp member and the second clamp member towards each other to retain the frame portion in a stationary position with respect to the top rail and thereby mount the tonneau cover to the cargo box.

31. The method of claim 30, and further comprising a resilient mechanism biasing the quick release clamp to the open configuration.

32. The method of claim 30, wherein the first clamp member includes a plurality of pivot recesses formed therein, wherein the second clamp member includes a pivot extension extending therefrom, and wherein the pivot extension is selectively seatable in one of the pivot recesses.

33. The method of claim 30, and further comprising a pair of guide walls extending from the first clamp member.

34. The method of claim 30, wherein the clamp handle is curved so that a free end of the clamp handle extends past the first clamp member when the quick release clamp is in a closed configuration.

* * * * *